(12) United States Patent
Chin et al.

(10) Patent No.: US 7,277,453 B2
(45) Date of Patent: Oct. 2, 2007

(54) INTER PRIVATE NETWORK COMMUNICATIONS BETWEEN IPV4 HOSTS USING IPV6

(75) Inventors: Kwan Wu Chin, Dulwich Hill (AU); John Thomas Judge, Coogee (AU)

(73) Assignee: Motorola, Inc., Schaumburg, IL (US)

( * ) Notice: Subject to any disclaimer, the term of this patent is extended or adjusted under 35 U.S.C. 154(b) by 915 days.

(21) Appl. No.: 10/448,555

(22) Filed: May 30, 2003

(65) Prior Publication Data

US 2004/0240468 A1 Dec. 2, 2004

(51) Int. Cl.
*H04J 3/16* (2006.01)
(52) U.S. Cl. ............... 370/466; 370/474; 370/392; 370/401; 370/395.5
(58) Field of Classification Search ............... 370/466, 370/392, 395.5, 401, 474, 475; 709/230
See application file for complete search history.

(56) References Cited

U.S. PATENT DOCUMENTS

2004/0107287 A1* 6/2004 Ananda et al. ............. 709/230

OTHER PUBLICATIONS

Ng, T.S. Eugene, Stoica, Ion, and Zhang, Hui, "A Waypoint Service Approach To Connect Heterogeneous Internet Address Space," USENIX Annual Technical Conference 2001.
Srisuresh, P., Tsirtsis, G., Akkiraju, P., and Hefferman, A., "DNS Extensions to Network Address Translators (DNS-ALG)", IETF RFC 2694, 1999.
Cheriton, D.R., and Gritter, M. "TRIAD: A New Next Generation Internet Architecture", http://www-dsg.stanford.edu/triad/triad.ps.gz, 2000.
Francis, P., and Gummadi, R., "IPNL: A NAT-Extended Internet Architecture", ACM SIGCOMM'2001.
Carpenter, B., and Moore, K., "Connection of IPv6 Domains via IPv4 Clouds", IETF RFC 3056.
Templin, F., Gleeson, T., Talwar, M., and Thaler, D., "Intra-Site Automatic Tunnel Addressing Protocol (ISATAP)", Internet Draft draft-ietf-ngtrans-isatap-04.txt, 2002.
URL (http://www.alumni.caltech.edu/—dank/peer-nat.html).
Borella, M., Lo, J., Grabelsky, D., and Montenegro, G., "Realm Specific IP: Framework", IETF RFC3102, 2001.

(Continued)

*Primary Examiner*—Seema S. Rao
*Assistant Examiner*—Wanda Z Russell

(57) ABSTRACT

A method (500), a system and a gateway (400) for communicating between hosts in private networks having IPv4 address spaces are disclosed. One or more DNS query messages for resolving resource records are transmitted (502) from a first private network for a remote host in a second private network. One or more DNS replies comprising a private IPv4 address for the remote host are received (504). If the one or more DNS replies comprise a synthesized IPv6 address, the IPv6 address is extracted from the replies and a peer IPv4 address in the first network is allocated for the remote host (508). The IPv6 address comprises a global IPv6 prefix and the private IPv4 address for the remote host. The peer IPv4 address is associated with an extracted IPv6 address for the remote host. The remote host is addressed using the IPv6 address for transmission of IPv4 packets from the first network addressed using the peer IPv4 address (510). The system comprises an application-level gateway of a domain name system (DNS-ALG), a virtual table, and a translator. The gateway comprises the foregoing system and a domain name system (DNS) server.

22 Claims, 5 Drawing Sheets

OTHER PUBLICATIONS

E. Nordmark, "Stateless IP/ICMP Translation Algorithm (SIIT)".
P. Mockapetris, "Domain Names—Concepts and Facilities".
G. Tsirtsis and P. Srisuresh, "Network Address Translation—Protocol Translation (NAT-PT)".
Y. Rekhter, B. Moskowitz, D. Karrenberg, G.J. de Groot and E. Lear, Address Allocation for Private Internets; and.
M. Crawford and C. Huitema, "DNS Extensions to Support IPv6 Address Aggregation and Renumbering".
P. Mockapetris, "Domain Names—Implementation and Specification";and.
R. Hinden and S. Deering, "IP Version 6 Addressing Architecture".

* cited by examiner

INTER PRIVATE NETWORK COMMUNICATIONS BETWEEN IPV4 HOSTS USING IPV6

FIELD OF THE INVENTION

This invention relates generally to the field of communication systems and networks and in particular to methods, systems, and gateways for interconnecting networks using private address spaces.

BACKGROUND

The Internet Protocol (IP) is the protocol most widely in use on the Internet for routing data from a source to a destination host. The Internet currently employs version four of the IP, or IPv4. IPv4 hosts are identified by a 32-bit address, for example 134.7.1.1. Each host on the Internet is assigned one or more unique IPv4 addresses where other hosts can refer unambiguously to a given host using one of its addresses. In addition, hosts on the Internet usually have one or more names associated with those hosts. This enables end users to refer to a given host using its name rather than use its 32-bit IPv4 address. To resolve names to IP addresses, the domain name system (DNS) provides the service of mapping names to corresponding IP addresses.

As a consequence of the dramatic rise in the number of hosts on the Internet and the inefficient allocation of IPv4 addresses, the IPv4 address space is nearing exhaustion. To combat the shortage of IPv4 addresses and to meet the growing demands of IPv4 addresses the Internet Engineering Task Force (IETF) specified the use of a network address translator (NAT) and dedicated a portion of the IPv4 address space as "private". The range of private addresses is defined in the IETF's Request for Comments (RFC) number 1918. With the help of a NAT, independent networks can reuse the private address space at their discretion when assigning addresses to hosts and these hosts are able to access other hosts on the Internet unambiguously. The NAT enables the sharing of one or more global IPv4 addresses assigned to private networks, so that packets emanating from private hosts in private networks have a valid and unambiguous global source address before leaving the private network. An example of private networks is a home network that is allocated a global IPv4 address upon dial-up, and users in the home network are able to share the global IPv4 address amongst multiple home devices using a NAT.

A significant disadvantage with accessing hosts behind a NAT is that one-to-many and many-to-one mappings must be performed from a gateway's global address for incoming and outgoing connections, respectively. Therefore, when a connection arrives at the gateway, the gateway must determine for which internal host the connection is destined. For example, if a home user runs a web-server and a file-sharing service, these services are registered using the gateway's global IPv4 address in order to be accessible from the global network, e.g. the Internet. Given that there is only one address associated with a multitude of applications within the private network (or behind the gateway), when a connection comes in, the gateway needs to know whether the connection is for the web-server or the file-sharing service. This problem is exacerbated by the fact that some NATs allow incoming traffic from an outside address if an outgoing packet has already been sent to the outside address. Consequently, the use of a NAT in a private network means it is harder to deploy peer-to-peer applications and thus severely impedes the application space of private networks.

Ng, T. S. Eugene, Stoica, Ion, and Zhang, Hui, "A Waypoint Service Approach To Connect Heterogeneous Internet Address Space," USENIX Annual Technical Conference 2001, 2001, describe a mechanism involving the integration of an application-level gateway (ALG) of a Domain Name System (DNS), i.e., a DNS-ALG, with one or more relays. Private hosts register their private addresses and corresponding names with the DNS-ALG along with their gateway's global IPv4 address. When a DNS query is received by the DNS-ALG, the DNS-ALG locates a free relay and informs the relay of the queried host's private address and the gateway's IPv4 address. The DNS-ALG then returns the relay's IPv4 address in its DNS reply. The requesting host then tries to establish a connection to the returned IPv4 address that happens to be the relay's address. The relay uses the information passed previously by the DNS-ALG to tunnel received packets to the target host's gateway. The target host's gateway then de-capsulates the packets and re-writes the packet header before forwarding the packets to the target host.

A once-off state is used by the relays to associate an incoming connection request with a destination host. This is due to the relay not having a reliable way of telling whether the source host of an incoming connection actually made the last DNS query. Further, the foregoing mechanism requires at least one global IPv4 address for translation purposes; however, this is not available in most home networks. The mechanism depletes the scarce global IPv4 address space to support peer-to-peer applications. The number of available IPv4 addresses for relaying purposes dictates the number of connections that can be made to private hosts, giving rise to connection limits.

Srisuresh, P., Tsirtsis, G., Akkiraju, P., and Hefferman, A., "DNS Extensions to Network Address Translators (DNS-ALG)", IETF RFC 2694, 1999, describe two NAT mechanisms. The NAT mechanism makes use of a DNS-ALG to help with the de-multiplexing incoming connections. This is achieved by having the DNS-ALG record the IPv4 address of the host that made the last DNS query and also the IPv4 address of the host being queried. The assumption is that once a host makes a DNS query a subsequent connection will follow. Once an incoming connection is detected, the NAT asks the DNS-ALG for the target host's IPv4 address, i.e., the IPv4 address of the host that was queried last. The NAT then translates the destination address in the incoming packets before forwarding the packets to the target host. This requires setting up the state to determine the target host within a private network. The other NAT mechanism is used when two networks having similar address spaces wish to communicate. For Network-A and Network-B, two hosts in each respective network may want to communicate without ambiguity even though the networks share similar address spaces. For the hosts to communicate, the NAT mechanism is installed between Network-A and Network-B, where all traffic between the two networks is intercepted and translated accordingly. The first translation serves to translate Network-A's address into another address space, e.g., 148.1.0.1 to 172.16.0.1. The second translation then translates the translated address, i.e., 172.16.0.1, into a globally routable address, e.g., 172.16.0.1 to 134.7.1.1. The DNS-ALG at the second NAT is also responsible for allocating a peer address for resource records (RRs) in DNS replies coming from Network-B, since the RRs contain a similar address space to that of Network-A. For external to internal communications, DNS-ALG installs states. This NAT mechanism requires four address mappings. Hence, to create a connection from one network to another, states need to be maintained for IPv4 to IPv4, and IPv4 to global IPv4 at each site. Further, this mechanism relies on a temporary soft state to associate an incoming connection with an internal host, which can cause connection ambiguity.

Cheriton, D. R., and Gritter, M. "TRIAD: A New Next Generation Internet Architecture", 2000, describe a mechanism involving the setting up of a "circuit" across realms with different address spaces. The name resolution and routing processes are integrated, whereby a name request is forwarded from one router to the next in which the ensuing packets follow. As the name request is forwarded, appropriate states are created at each router that identify the destination relay in the current realm to forward a packet to. To use the created state, a new header with a label for the created state is inserted between the IP header and the payload. Using the label, a router obtains the forwarding relay address and modifies the source and destination fields accordingly before forwarding the packet to the relay leading to the next addressing realm.

This mechanism involves considerable signaling, packet manipulation, packet overheads, and complexity. The mechanism relies on the name resolution process to install states at a relay node that indicates the destination or target node of a given connection.

Francis, P., and Gummadi, R., "IPNL: A NAT-Extended Internet Architecture", ACM SIGCOMM'2001, 2001, describe a mechanism to interconnect private realms together over the global Internet. The NAT architecture is extended further so that hosts within NATed sites are accessible from other private and global hosts. NATed sites form an overlay network over the existing IPv4 Internet. The mechanism aims to create such an overlay network so that the NATed sites benefit from invariance to renumbering, avoid running out of IPv4 address space, and the global Internet's routing table size scales relative to number of private sites rather than number of hosts, etc. In addition, the mechanism makes use of DNS names extensively to facilitate ease of renumbering a given site and serves as end-to-end identifier. This mechanism requires new headers and host modifications for the mechanism to work. Further, the mechanism requires additional protocols to maintain the ability of an IPv4 address to act as an identifier and locator of host.

Carpenter, B., and Moore, K., "Connection of IPv6 Domains via IPv4 Clouds", IETF RFC 3056, and Templin, F., Gleeson, T., Talwar, M., and Thaler, D., "Intra-Site Automatic Tunnel Addressing Protocol (ISATAP)", "Internet Draft draft-ietf-ngtrans-isatap-04.txt, 2002, describe a mechanism that can be made to access internal hosts by embedding target host's address in the IP version (IPv6) address. However, this mechanism only enables IPv6 to IPv4 communication, meaning the mechanism enables access to an internal IPv4 host from an external IPv6 host.

"One website" The URL describes a mechanism targeted at UDP-based peer-to-peer applications. The mechanism involves using a third party broker to inform a private host of a gateway's global IPv4 address and also for opening up a bi-directional NAT hole. By knowing the gateway's global IP address, the host is able to exchange the host's global address with the peer host instead of sending the host's un-routable private address to the peer host. This mechanism uses an out-of-band protocol to signal a $3^{rd}$ party service to perform the same functionality as the DNS-ALG. Further, this mechanism does not make use of IPv6 and related IPv4/IPv6 transition technologies. Still further, this mechanism has problems with identifying hosts within the private network unambiguously.

Borella, M., Lo, J., Grabelsky, D., and Montenegro, G., "Realm Specific IP: Framework", IETF RFC3102, 2001, describe a mechanism that is a replacement to the conventional NAT where hosts take an active role in the creation of a binding at the gateway located between public and private network. As a result, the gateway has an easier time de-multiplexing in/out-bound connections, because internal hosts have informed the gateway of their interest in receiving or sending connections. This mechanism involves setting up bindings at the gateway, requiring a number of global IPv4 addresses or port numbers, and modifications to hosts.

Thus, a need clearly exists for hosts from a private network to access unambiguously hosts in another private network, even though the private networks share only one global IPv4 address.

SUMMARY

In accordance with a first aspect of the invention, there is provided a method of communicating between IPv4 hosts in networks having private IPv4 address spaces. One or more DNS queries are transmitted from a first private network for a remote IPv4 host in a second private network. The one or more DNS queries contain one or more resource record questions for the remote host name based on information from a requesting private IPv4 host in the first private network. One or more DNS replies are received at the first private network from the second private network in response to the one or more DNS queries. A check is made to detect whether the one or more DNS replies comprise a private IPv4 address for the remote host in the second private network. If the one or more DNS replies comprise a synthesized IPv6 address, the IPv6 address for the remote host is extracted in the first private network from the one or more DNS replies. The synthesized IPv6 address includes a global IPv6 prefix and the private IPv4 address for the remote host. A peer IPv4 address in an address space of the first private network is allocated for the remote host. The peer IPv4 address is associated with the extracted IPv6 address for the remote host. The remote host is addressed using the IPv6 address associated with the peer IPv4 address for transmission of IPv4 packets from the first private network addressed using the peer IPv4 address.

Further, the method may comprise the steps of, if the one or more DNS replies comprises the private IPv4 address but not a synthesized IPv6 address, transmitting from the first private network one or more IPv6 address DNS queries for the remote IPv4 host in the second private network, and receiving at the first private network one or more IPv6 address DNS replies from the second private network containing the synthesized IPv6 address.

Preferably, an IPv4 to IPv6 address mapping is allocated in the first private network for associating the peer IPv4 address with the extracted IPv6 address for the remote host. Further, a peer IPv4 to IPv6 address mapping may be allocated in the second private network. A check is made to determine whether a private address of the queried remote host is registered in a domain name system of the second private network, and if so, the synthesized IPv6 address is returned in the one or more DNS replies.

Preferably, the method further comprises the step of translating IPv4 packets into IPv6 packets.

The IPv6 packets may be transmitted via an IPv6 global network to the remote host in the second private network, or via an IPv4 global network using IPv6-over-IPv4 tunneling to the remote host in the second private network.

The method may comprise the step of constructing an IPv6 address DNS query as one of the DNS queries in response to an IPv4 address DNS query from the requesting private IPv4 host. The remote host name is extracted from the IPv4 address DNS query.

The method may further comprise the steps of receiving the one or more DNS queries in the second private network, and transmitting the one or more DNS replies from the second private network. Further, IPv6 packets may be translated into IPv4 packets in the second private network. Still further, the IPv4 packets may be transmitted in the second private network to the remote host.

In accordance with a second aspect of the invention, there is provided a system for communicating via a gateway between IPv4 hosts in different networks having private IPv4 address spaces and separated by a global network. An application-level gateway of a domain name system (DNS-ALG) is capable of being coupled to a gateway having a domain name system (DNS) server. The DNS-ALG detects a need for communications between a first IPv4 host in a first private network and a second IPv4 host in a second private network via the global network using IPv6 packets. The second private network is a different one to the first private network. The DNS-ALG is adapted for synthesizing an IPv6 address using a global IPv6 address prefix and a private IPv4 address for the host. A virtual table is coupled to the DNS-ALG for storing a mapping between IPv4 and IPv6 addresses of one of the first and second IPv4 hosts. A translator is coupled to the virtual table for communication with the DNS-ALG, and is capable of translating IPv4 addresses to IPv6 addresses and IPv6 addresses to IPv4 addresses and terminating an IPv6 connection through the gateway. Further, the translator is capable of requesting the allocation of a peer IPv4 address from the DNS-ALG.

In accordance with a third aspect of the invention, there is provided a gateway communicating between IPv4 hosts in different networks having private IPv4 address spaces and separated by a global network. The gateway comprises a domain name system (DNS) server. An application-level gateway of a domain name system (DNS-ALG) is coupled to the DNS server. The DNS-ALG detects a need for communications between a first IPv4 host in a first private network and a second IPv4 host in a second private network via the global network using IPv6 packets. The second private network is a different one to the first private network. The DNS-ALG is adapted for synthesizing an IPv6 address using a global IPv6 address prefix of the gateway and a private IPv4 address for the host. A virtual table is coupled to the DNS-ALG for storing a mapping between IPv4 and IPv6 addresses of one of the first and second IPv4 hosts. A translator is coupled to the virtual table for communication with the DNS-ALG. The translator is capable of translating IPv4 addresses to IPv6 addresses and IPv6 addresses to IPv4 addresses and terminating an IPv6 connection through the gateway. Further, the translator is capable of requesting the allocation of a peer IPv4 address from the DNS-ALG.

These and other aspects of the invention are set forth in greater detail hereinafter.

BRIEF DESCRIPTION OF THE DRAWINGS

Embodiments of the invention are described hereinafter with reference to the drawings, in which.

DETAILED DESCRIPTION

Figure 1:
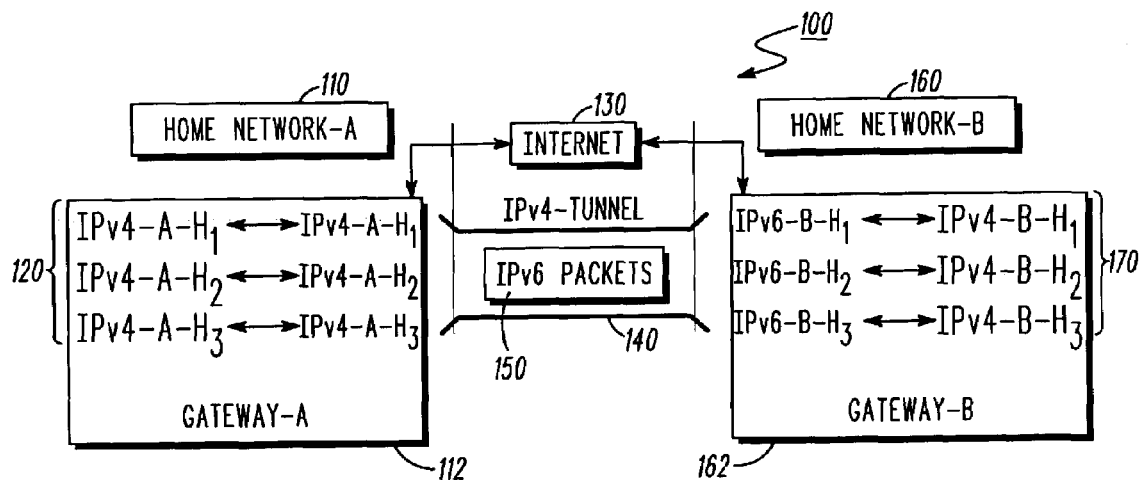
FIG. 1 is a block diagram illustrating a model of end-to-end communication between private networks.

Methods, systems, and gateways are disclosed for interconnecting networks having IPv4 hosts with private address spaces using IPv6. In the following description, numerous specific details, including gateway configurations, private network applications, and the like are set forth. However, from this disclosure, it will be apparent to those skilled in the art that modifications and/or substitutions may be made without departing from the scope and spirit of the invention. In other circumstances, specific details may be omitted so as not to obscure the invention.

The methods for interconnecting networks having IPv4 hosts with private address spaces using IPv6 may be implemented in modules. A module, and in particular its functionality, can be implemented in either hardware or software. In the software sense, a module is a process, program, or portion thereof, that usually performs a particular function or related functions. Such software may be implemented in Java, C, C++, Fortran, for example, but may be implemented in any of a number of other programming languages/systems, or combinations thereof. In the hardware sense, a module is a functional hardware unit designed for use with other components or modules. For example, a module may be implemented using discrete electronic components, or it can form a portion of an entire electronic circuit such as an Field Programmable Gate Arrays (FPGA), Application Specific Integrated Circuit (ASIC), and the like. A physical implementation may also include configuration data for a FPGA, or a layout for an ASIC, for example. Still further, the description of a physical implementation may be in EDIF netlisting language, structural VHDL, structural Verilog or the like. Numerous other possibilities exist. Those skilled in the art will appreciate that the system can also be implemented as a combination of hardware and software modules.

I. Overview

The embodiments of the invention implement "virtualisation" of private IPv4 hosts into IPv6 hosts by associating IPv4 hosts with IPv6 addresses, resulting in end-to-end address-ability of these IPv4 hosts. Once the private IPv4 hosts are associated with an IPv6 address, the private IPv4 hosts are considered to be global hosts having a valid end-to-end global address, accessible using the IPv6 protocol. Using this scheme, IPv4 hosts from a private network are able to unambiguously access IPv4 hosts in another private network. Even though the private networks share only one global IPv4 address, the embodiments of the invention enable connections to private hosts to be multiplexed based on their virtual address, rather than the one global IPv4 address and a port number that usually involves the use of a once-off state. This is illustrated conceptually in greater detail with reference to FIG. 1.

II. Definitions

The components utilised in the embodiments of the invention and the functionalities of each component are defined. Flow diagrams are also provided in relation to the operations of components.

A. "Transport relay" is a relay that translates IPv4 into IPv6 connections or alternatively IPv4 into IPv6 packets. Further details can be found in: Hagino, J. I., and Yamamoto, K, "An IPv6-to-IPv4 Transport Relay Translator," IETF RFC 3142, 2001; Nordmark, E., "Stateless IP/ICMP Translation Algorithm (SIIT)," IETF RFC 2765, 2000; and Kitamura, H, "A SOCKS-based IPv6/IPv4 Gateway Mechanism," IETF RFC 3089, 2001. Currently there are various transport relay implementations. Examples of relays are disclosed by Srisuresh, P. Tsirtsis, G, Akkiraju, P, and Hefferman, A, "DNS Extensions to Network Address Translators (DNS-ALG)," IETF RFC 2694, 1999, and Tsirtsis, G, "Network Address Translation—Protocol Translation," IETF RFC 2766, 2000, and E. Nordmark (2000) Stateless IP/ICMP Translation Algorithm (SIIT), IETF RFC2765. The embodiments of the invention require that any adopted transport relay have the following capabilities:

1. Able to connect to an IPv6 destination, where DNS-ALG provides the destination's IPv6 address.
2. Able to intercept connections destined to a peer IPv4 address range allocated for translation purposes and also IPv6 address of the form 2002:GW-IPv4:ffff::/96, assuming the 6to4 mechanism is used to tunnel IPv6 packets across an IPv4 Internet. Therefore, it is recommnended that the relay and DNS-ALG reside on the same machine, thereby allowing easy exchange of mapping information. The peer IPv4 address may be chosen arbitrarily; a system administrator can choose an address range that is designated as "peer". An example of a peer IPv4 address having the form "172.16.x.y" is merely illustrative. Other IPv4 address ranges from the private address space, as defined in IETF RFC 1918, may be used provided the address ranges are not being used by other hosts in the network. For IPv6 addresses, the "ffff," portion embedded in the IPv6 address signifies a translatable address and is specified by Hinden, R, "IP Version 6 Addressing Architecture," IETF RFC 1884, 1995, p. 9. The "2002:GW-IP v4 " prefix means a 6to4 mechanism (described hereinafter) is being used, but this is not required if the Internet becomes IPv6. The IPv6 address should have an embedded "ffff" portion and the lower 32-bits of the IPv6 address should contain the IPv4 address of the target host.
3. Able to send a request to the DNS-ALG to request a peer address allocation, after receiving an incoming connection containing the aforementioned peer address in the destination field.

Figure 3:
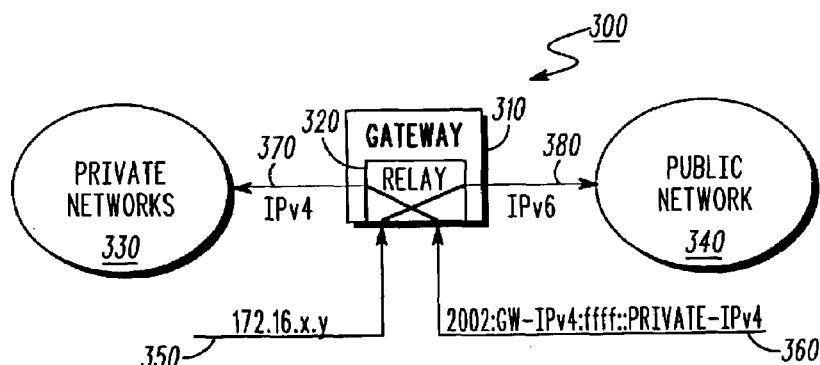
FIG. 3 is a block diagram of a gateway with a relay between private networks and a public network.

FIG. 3 is a block diagram illustrating the configuration 300 of a transport relay 320 in a gateway 310, in accordance with the embodiments of the invention. The gateway 310 includes the relay 320 and interfaces between private networks 330 and a global or public network 340. The relay 320 intercepts connections 350, 360 respectively destined to a peer IPv4 address (e.g., 172.16.x.y) and an IPv6 address (e.g., 2002:GW-IPv4:ffff::/96).

To ensure that peer addresses are routed to the gateway 310, these addresses are included in a routing table, so that packets bearing any of these addresses in their destination field are routed to the relay 320 for processing.

After receiving a connection directed to an IPv4 peer address, the relay 320 asks the DNS-ALG for an IPv6 mapping. After retrieving the corresponding IPv6 address, a connection is established (or packet headers translated) to the destination IPv6 host. On one end, the relay 320 accepts an IPv4 connection (or packets) 350 from a private IPv4 host and creates an IPv6 connection (or packets) 380 to the destination host. On the other, the relay 320 accepts an incoming connection (or packets) 360 and creates an IPv4 connection (or packets) 370 to the destination host.

A. transport relay is only one form of translator that translates IPv4 addresses to IPv6 addresses, and vice versa, with which embodiments of the invention may be practiced. Other forms of translator may be practiced, provided that the translator comprises a network address translator adapted to intercept connections for a peer IPv4 address and an IPv6 address and adapted to request the DNS-ALG to obtain a peer address allocation.

B. "6to4 mechanism" is a mechanism to tunnel packets across an IPv4 cloud. Further details can be found in Carpenter, B, and Moore, K, "Connection of IPv6 Domains via IPv4 Clouds," IETF RFC 3056, 2001. In the embodiments of the invention, the 6to4 mechanism is employed to tunnel IPv6 packets generated from a transport relay or other suitable network address translator across the IPv4-based Internet cloud. The 6to4 mechanism creates a tunnel to a destination node using the embedded IPv4 address in the IPv6 address. Once the Internet has migrated to IPv6, the embodiments of the invention continue to work minus the additional tunnelling of IPv6 packets over the IPv4 cloud. However, in the case where a 6to4 mechanism is not employed, the embodiments of the invention require that the lower 32-bits of the IPv6 address be used to store the private IPv4 address and some form of marker in the IPv6 address that designates the IPv6 address as peer so a translator/relay may pick up packets bearing the IPv6 address and translate the packets accordingly. The embodiments of the invention use the 6to4 mechanism or any automatic tunnelling mechanism that is able to dynamically create a tunnel based on embedded IPv4 addresses within an IPv6 address.

C. Trigger: A trigger provides a mechanism whereby the local DNS-ALG can infer a remote host's support of the embodiments of the invention. This enables the DNS-ALG to perform a query for the remote host's AAAA/A6 resource record (RR) immediately when the requesting host asks for an A RR. An example trigger for invoking the embodiments of the invention is hosts registering their names under a pre-configured domain, e.g. toaster.464vpn.kwan.home.net, where the domain "464vpn" is the trigger. Another example trigger involves the DNS-ALG first detecting that hosts have registered their private addresses in the DNS resulting in the return of a DNS reply containing a synthesized AAAA/A6 RR. At the requesting DNS-ALG, upon detecting the presence of the synthesized AAAA/A6 RR, the DNS-ALG proceeds with the creation of a mapping as specified in the embodiment of this invention. Other examples include additions to DNS RRs, for example using a peer string in the TXT RR, definition of a new RR and using one of the reserved bits on the DNS header. Hosts that are associated with the trigger are subsequently defined as "exported".

D. DNS-ALG: application level gateway of domain name server. Details of DNS-ALG can be found in Srisuresh, P, Tsirtsis, G, Akkiraju, P, and Hefferman, A, "DNS Extensions to Network Address Translators (DNS-ALG)," IETF RFC2694, 1999 and Tsirtsis, G, "Network Address Translation—Protocol Translation," IETF RFC 2766, 2000. Further details of the augmented DNS-ALG for the embodiments of the invention are set forth below.

The DNS-ALG is responsible for detecting that a "tunnel" needs to be established between two hosts. The DNS-ALG does this by detecting the presence of the previously mentioned trigger.

1. Upon receiving a DNS request from an external host for an "exported" host, the DNS-ALG tries to resolve the request from the local name server. Given that the "exported" host has its private IPv4 address registered, the DNS-ALG synthesizes an AAAA RR using the 6to4 prefix, gateway global IPv4 address and the host's private IPv4 address. The resulting address has the form, 2002:GW's IPv4-address:ffff::Host's Private-IPv4-Address. This address is then returned in the DNS reply to the requesting host.

2. At the requesting host's DNS-ALG, given that the request was successful, the DNS-ALG allocates a peer private IPv4 address (e.g., 172.16.1.1) that maps into the returned IPv6 address. After that, the address 172.16.1.1 is stored along with the IPv6 address that the IPv4 address maps to, and the DNS-ALG returns the 172.16.1.1 address in an A RR back to the requesting host. The DNS-ALG in each respective home network decides on the peer private IPv4 address to associate with a given IPv6 address, and the peer private IPv4 address is irrespective of the address chosen by the corresponding DNS-ALG of a given session. Thus, the DNS-ALG chooses independently the IPv4 address that maps to the remote host's IPv6 address, i.e, without checking with the remote network the IPv4 address that was allocated to the local IPv4 host.

3. This step requires the translator to request the DNS-ALG to allocate a peer IPv4 address and associates the allocated IPv4 address with the IPv6 address of the incoming connection. The DNS-ALG then informs the translator of the allocated IPv4 address and the translator translates the incoming packets from IPv6 into IPv4 where the source field of the IPv4 packets is set to the IPv4 address returned by the DNS-ALG.

The peer address has to be an address space that is not in use by the private networks and must be from the private address space as specified in RFC 1918. However, when the Internet cloud is transformed completely into IPv6, the restrictions on the use of private address space may be relaxed where any IPv4 address space can be used, as long the IPv4 address space is not in use within the network.

E. Name server: this server holds details of hosts that have been "exported". The embodiments of the invention assume that the gateway has been delegated a name space that the gateway is authoritative for. For example, the domain "kwan" in kwan.home.net may be delegated to the DNS running at the home gateway. Hence, queries such as toaster.kwan.home.net are routed to the DNS at the home gateway for resolution.

III. Tunnelling Concept

FIG. 1 is a block diagram of Network-A 110 and Network-B 160 with hosts (not shown) that have been "virtualized" into IPv6 hosts resulting in end-to-end reach-ability (in the IPv6 sense) across a global network 130. Home Network-A 110 has a gateway-A 112 coupled to the global network 130, e.g. the Internet. Further, Home Network-B 160 is also coupled to the global network 130 by gateway-B 162. Each gateway 112, 162 interconnects two computer networks having different network architectures and connects hosts within a given network. Thus, a gateway may perform protocol translation/conversion and act as an ordinary router. In this embodiment, the Home Network-A 110, Home Network-B 160, and global network 130 all use IPv4. The term "IPv4 host" used herein refers to IPv4-only host.

An IPv4 tunnel 140 is formed through the global network 130 for transmitting IPv6 packets 150. The Internet is currently primarily IPv4, however, the IETF ngtrans working group has standardized various schemes that enable IPv6 hosts to communicate across the IPv4 Internet. The embodiments of the invention can employ some of these schemes. In the embodiments of the invention, a mapping 120, 170 is associated with the respective gateway 112, 162 of private networks 110, 160, respectively. The mappings 120 and 170 each contain IPv4 and IPv6 address for respective hosts in home network-A 110 and home network-B 160.

"Virtualizing" these private IPv4 hosts into IPv6 advantageously removes the ambiguity as to which target host an incoming connection is trying to connect to. This results because the connection can be de-multiplexed based on the destination IPv6 address, rather than using a combination of the gateway's global IPv4 address and a port number. Moreover, "virtualizing" avoids the problems associated with the use of a once-off state, since the home gateway 112, 162 knows exactly which IPv4 host an incoming connection is destined for due to the address embedded within the IPv6 address. This avoids the use of having a timer associated with a soft-state containing the last host queried through the DNS that is open to denial-of-service attacks.

The following observations are relevant to the embodiments of the invention:

1. A private or home network has a number of private address spaces, from which to allocate addresses. Using this private address space, an IPv4 to IPv6 mapping 120, 170 can be created for each IPv4 host that communications with are desired. Therefore, by "virtualizing" hosts in peer private networks 110, 160 as "IPv6 hosts", private IPv4 hosts in one private network are able to directly address peer private IPv4 hosts with a unique IPv4 address instead of having to rely on a NAT to multiplex these hosts' addresses over a single global IPv4 address.

2. All IPv4 hosts within a private network can be allocated a global IPv6 address created from the respective host's IPv4 private address along with a global IPv6 prefix. For example, if the gateway has been assigned a global IPv4 address of 134.7.1.1, and using the 6to4 mechanism described by Carpenter, B, and Moore, K, "Connection of IPv6 Domains Via IPv4 Clouds", IETF RFC 3056, 2001, the home network's global prefix is 2002: 134.7.1.1/48. Therefore, an IPv4 host with an IPv4 address 192.168.1.1 within the home network has a global IPv6 address of 2002:134.7.1.1::192.168.1.1. The private IPv4 host need not be aware of its IPv6 address given that the IPv4 host is likely to have an IPv4-only stack. In addition the pseudo IPv6 address can be generated dynamically using a DNS-ALG when a request for the IPv4 host is received or can be registered at the local name server when the IPv4 host performs address configuration.

Mapping 120 for home network-A 110 contains three entries for three IPv4 hosts in that network. A first host has an IPv4 address denoted generally as IPv4-A-$H_1$, and a corresponding IPv6-A-$H_1$. The second and third hosts of network-A 110 have IPv4 addresses, IPv4-A-$H_2$ and IPv4-A-$H_3$, respectively, and corresponding IPv6 addresses, IPv6-A-$H_2$ and IPv6-A-$H_3$. Mapping 170 for home network-B 160 is organized similarly for three hosts in that network, for example.

From the above observations, each private IPv4 host in a home network can be made globally accessible from any other remote network using IPv6, and private hosts can refer to peer private hosts by associating an IPv4 address with a pseudo IPv6 address. For private IPv4 hosts to access other private IPv4 hosts, the mapping is created at the gateway node that maps between a peer host's "virtualized" IPv6 address and a local private IPv4 address. Optionally, this mapping may be implemented in the private network "behind" the gateway, i.e. removed from the gateway. The mapping is created independently, and the mapping need not match the mapping created by or associated with the peer gateway. However, the gateways of both networks may coordinate the IPv4 addresses used in creating the mapping. For example, the mapping may give the impression that the peer host resides in the same network. This local private IPv4 address is returned to a local host wanting to communicate with a given peer host. Hence from the perspective of a host receiving this "peer" local address the destination host is another IPv4 host and it is oblivious to the fact that tunneling is used to deliver its packets to the target host.

Figure 5:
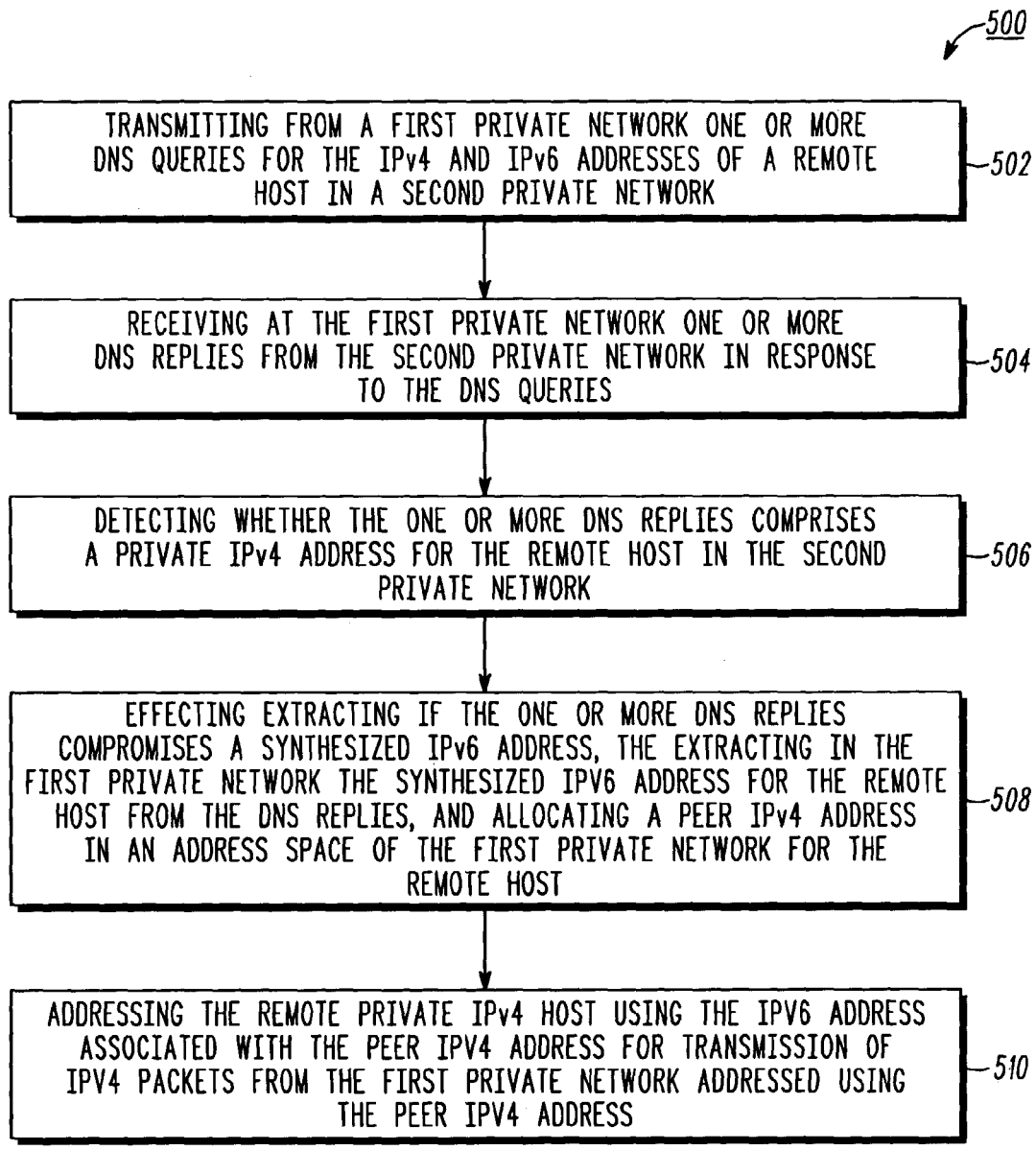
FIG. 5 is a high-level flow diagram of a process communicating between IPv4 hosts in networks having private IPv4 address spaces in accordance with another embodiment of the invention.

FIG. 5 is a high-level flow diagram illustrating a process 500 of communicating between IPv4 hosts in networks having private IPv4 address spaces. Processing commences in step 502. In step 502, one or more DNS queries are transmitted from a first private network for a remote host in a second private network. The queries may be resolving IPv4 and IPv6 addresses. The DNS query messages contain the remote host name based on information from a requesting private IPv4 host in the first private network. This information may be obtained from an IPv4 address DNS query. In step 504, one or more DNS replies are received at the first private network from the second private network in response to the DNS queries. In step 506, a check is made to detect whether the one or more DNS replies comprise a private IPv4 address for the remote host in the second private network. In step 508, if the one or more DNS replies comprise a synthesized IPv6 address for the remote host, the synthesized IPv6 address for the remote host is extracted in the first private network from the DNS replies, and a peer IPv4 address in an address space of the first private network is allocated for the remote host. The synthesized IPv6 address includes a global IPv6 prefix and a private IPv4 address for the remote host in the second private network. The peer IPv4 address is associated with the extracted IPv6 address for the remote host. In step 510, the remote IPv4 host is addressed using the IPv6 address associated with the peer IPv4 address for transmission of IPv4 packets from the first private network addressed using the peer IPv4 address. Processing then terminates. This process 500 is described in greater detail hereinafter with reference to FIG. 2.

If the one or more DNS replies comprise the private IPv4 address but not a synthesized IPv6 address, one or more IPv6 address DNS queries are transmitted from the first private network for the remote IPv4 host in the second private network, and one or more IPv6 address DNS replies from the second private network containing the synthesized IPv6 address are received at the first private network.

Figure 2:
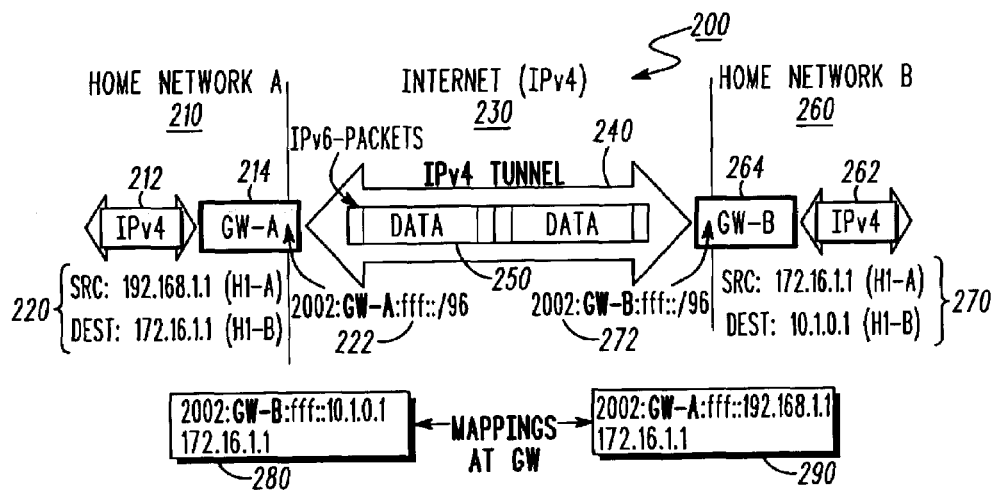
FIG. 2 is a more detailed block diagram of communications between two private networks.

FIG. 2 illustrates further the configuration 200 and operation of the embodiment of the invention, involving home network-A 210, global network 230, and a home network-B 260. A private host H1-A (not shown) is located in the home-network-A 210, and a private host H1-B (not shown) is located in the home-network-B 260. IPv4 communications 212 occur between the host H1-A and a gateway-A (GW-A) 214 of the home network-A 210. Likewise, IPv4 communications 262 occur between the host H1-B and a gateway-B (GW-B) 264 of the home network-B 260. The source and destination addresses 220 of packets emitted from from H1-A to H1-B are 192.168.1.1 and 172.16.1.1, respectively. The source and destination addresses 270 of packets emitted from H1-B to H1-A are 10.1.0.1 and 172.16.1.1, respectively. The IPv6 prefixes 222, 272 associated with GW-A 214 and GW-B 264 are in form 2002:GW-A:ffff::/96 and 2002:GW-B:ffff::/96, respectively.

IPv6 packets 250 are transmitted between GW-A 214 and GW-B 264 in the IPv4 tunnel 240 over the global network 230. As explained in greater detail hereinafter, mappings 280 and 290 are formed at the GW-A 214 and the GW-B 264, respectively. The mapping 280 at the GW-A 214 has IPv6 and peer IPv4 addresses 2002:GW-B:ffff::10.1.0.1 and 172.16.1.1, respectively, and the mapping 290 at the GW-B 264 has IPv6 and peer IPv4 addresses 2002:GW-A:ffff::192.168.1.1 and 172.16.1.1, respectively. The term "GW-A" used in the address representation "2002:GW-A:ffff::192.168.1.1" reflects the global IPv4 address of GW-A 214, likewise "2002:GW-B:ffff:10.1.0.1" for GW-B. A network's Internet service provider typically allocates the global IPv4 address.

In addition, in FIG. 2 both GW-A and GW-B have chosen the "peer" IPv4 address from the 172.16.1.x range. However, both gateways (GWs) are free to use other private address ranges, since the address chosen has local significance, i.e., the peer GW does not need to know the IPv4 address allocated to the remote host.

In another embodiment, the GWs may use a peer host's real IPv4 address if there are no address conflicts rather than allocate addresses from a different private address range. For example, in FIG. 2, GW-A 214 may use the address 10.1.0.1 instead of 172.16.1.1. Similarly, GW-B 264 may use H1-A's real address, 192.168.1.1. The real addresses of hosts H1-A and H1-B can be extracted from their respective IPv6 addresses. The advantage of using H1-A and H1-B's real addresses is that doing so avoids the installation of application-level gateways (DNS-ALGs) that are specific to a given application to translate IPv4 address within the data portion of the packet.

Regardless of the address chosen to represent the remote host, a gateway (GW) must provide reachability to the allocated address by including a route entry in the routing table. In an embodiment where the remote host is allocated an address that makes the remote host appear to reside on the same subnet as the local host, the GW must assign an alias to the appropriate network interface using the allocated address. This needs to be done so that the GW is able to accept packets on behalf of the remote host.

The private host H1-A located in the home-network-A 210 establishes a bi-directional communication channel with the other private host H1-B located in the home-network-B 260 as follows:

1. Hosts H1-A and H1-B register their private addresses with the respective DNS server running gateway-A (GW-A) 214 and gateway-B (GW-B) 264, respectively. The home gateways 214, 264 are equipped with a modified DNS-ALG that synthesizes an IPv6 address from H1-A's IPv4 address. Such a modified DNS-ALG is described by Srisuresh, P., Tsirtsis, G., Akkiraju, P., and Hefferman, A. "DNS Extensions to Network Address Translators (DNS-ALG)", IETF RFC 2694, 1999. More details concerning the required functionalities of the DNS-ALG are set forth above.

2. To establish a communication channel with the host H1-B, the host H1-A sends a DNS request to GW-A 214 to obtain host H1-B's IPv4 address.

3. The request is sent to the DNS-ALG (not shown) running at GW-A 214 given that the host H1-A has been configured to send all its DNS queries to GW-A during host configuration. The DNS-ALG then proceeds to perform standard DNS name resolution where the DNS-ALG asks for both A and AAAA/A6 RRs. Through DNS's iterative or recursive process, the name resolution process eventually queries the DNS-ALG at GW-B 264 assuming that the domain that H1-B's belongs to has been delegated to the GW-B 264. The iterative and recursive resolution of DNS queries are described in Mockapetris, P, "Domain Names—Concept and Facilities," IETF RFC 1034, 1987, and Mockapetris, P, "Domain Names—Implementation and Specification," IETF RFC 1035, 1987.

4. The DNS-ALG at GW-B 264 synthesizes a global IPv6 address for the host H1-B and returns the address to the GW-A 214. From FIG. 2, the synthesized address for the host H1-B is 2002:GW-B:ffff::10.1.0.1, assuming the use of the 6to4 mechanism to construct an IPv6 prefix. The 6to4 mechanism is described by Carpenter, B., and Moore, K., "Connection of IPv6 Domains via IPv4 Clouds, IETF RFC 3056, 2001.

5. Upon receiving a DNS-reply from the DNS-ALG GW-B 264, the DNS-ALG of GW-A 214 determines that the query was successful and proceeds to the task of allocating a private IPv4 address that is associated with the returned IPv6 address. As an example, the peer private IPv4 address 172.16.1.1 may be allocated and this address is returned to the host H1-A. The peer address has to be an address space that is not in use by the respective private network and must be from the private address space as specified in RFC 1918. The IPv4-to-IPv6 translator uses the mapping to translate/proxy the IPv4 packets/connections into IPv6 packets/connections. How the resulting IPv6 packets/connections are handled after that is independent of the translator/proxy. For example, the 6 to 4 mechanism may be employed to transmit IPv6 packets across the IPv4 Internet.

6. After receiving a DNS-reply, the host H1-A starts sending its packets to the address 172.16.1.1. The gateway GW-A 214 must advertise reachability to the peer IPv4 address to route packets bearing the peer address as destination to the gateway.

7. At GW-A 214, the translator queries the DNS-ALG to obtain the IPv6 address that the address 172.16.1.1 maps to. In this case, the DNS-ALG returns the host H1-B's global IPv6 address 2002:GW-B:ffff::10.1.0.1 (shown in mapping 280).

8. Using the retrieved IPv6 address, the translator makes a connection to the IPv6 address.

9. After step 8, the packets generated from the translator are IPv6 packets 250, with the source and destination field set to 2002:GW-A: ffff::192.168.1.1 and 2002: GW-B:ffff::10.1.0.1 respectively. Given that the gateway is connected to an IPv4 Internet 230, IPv6 over IPv4 tunneling 240 is required. In this case, the 6to4 mechanism is employed to get H1-B's packets to GW-B. See Carpenter, B, and Moore, K, "Connection of IPv6 Domains Via IPv4 Clouds", IETF RFC 3056, 2001.

10. At GW-B 264, the IPv4 packets are de-capsulated by the 6to4 mechanism and the resulting IPv6 packets are passed to the resident translator due to the fact that these IPv6 packets contain an IPv6 address of the form 2002:GW-B:ffff/96 272 (note the ffff indicates a translator is required) with the host H1-B's IPv4 address embedded in the last 32 bits of the IPv6 address. From the IPv6 address, due to the embedded IPv4 address, the translator knows exactly which host the packets are for. Thus, the translator is able to use the embedded IPv4 address to create a connection (or translate packet headers accordingly) to the target host. Before translating the packets to IPv4, the translator asks the DNS-ALG to allocate a peer IPv4 address, for example 172.16.1.1, that maps into H1-A's IPv6 address, i.e., 2002:GW-A: ffff::192.168.1.1. This mapping is used to route returning packets from H1-B to H1-A using the previously described process.

Further details of this process are described hereinafter in respect of the gateway of FIG. 4 and the processes of FIGS. 6 and 7.

IV. Enhanced Gateway

Figure 4:
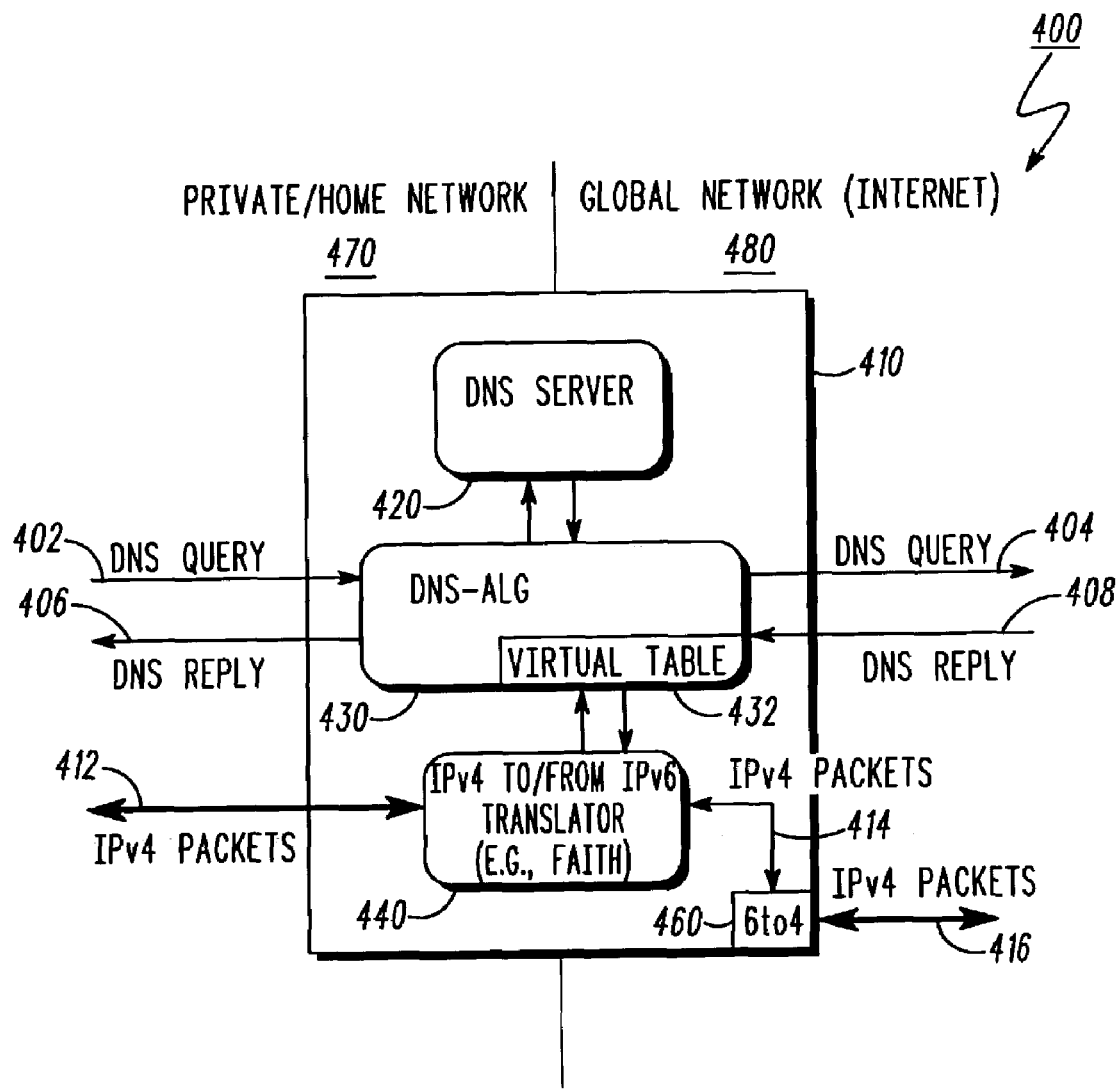
FIG. 4 is a block diagram of a gateway between a private/home network and a global network such as the Internet in accordance with an embodiment of the invention.

FIG. 4 is a block diagram of a gateway 410 that can be used as gateway-A 214 and gateway-B 264 in FIG. 2. The configuration 400 of the gateway 410 coupled to a private/home network 470 and a global network 480, e.g. the Internet, is depicted. The gateway 410 includes a DNS server 420. Preferably, the gateway 410 includes a DNS-ALG 430. The DNS-ALG 430 transmits and receives information to and from the DNS server 420. The gateway 420 also preferably has a virtual table 432, containing IPv4 and IPv6 mappings. Optionally, this virtual table 432 is included in the DNS-ALG 430. The DNS-ALG 430 receives DNS queries 402 from and provides DNS replies 406 to the private network 470. Further, the DNS-ALG 430 receives DNS queries 404 from and provides DNS replies 408 to the global network 480.

Preferably, the gateway 410 includes an IPv4/IPv6 translator module 440, such as the transport relay described above. The translator module 440 receives and transmits IPv4 packets 412 to and from the private network 470. Further, the translator module 440 provides and receives IPv6 packets 414. For the case where the global network 480 is IPv4, the gateway preferably includes a 6to4 mechanism 460 for receiving and transmitting IPv4 packets 416 via the global network 480. If the global network 480 is IPv6, the 6to4 mechanism 414 is not required as the IPv6 414 can be transmitted directly to that network 480.

In other embodiments of the invention, one or more of the DNS-ALG 430, virtual table 432, translator module 440 and 6to4 mechanism 460 may be implemented externally to the gateway 410 in the private network 470 without departing from the scope and spirit of the invention. Details of the operation of the enhanced gateway in terms of the client host and the remote host are set forth in FIGS. 6 and 7, respectively.

Figure 6:
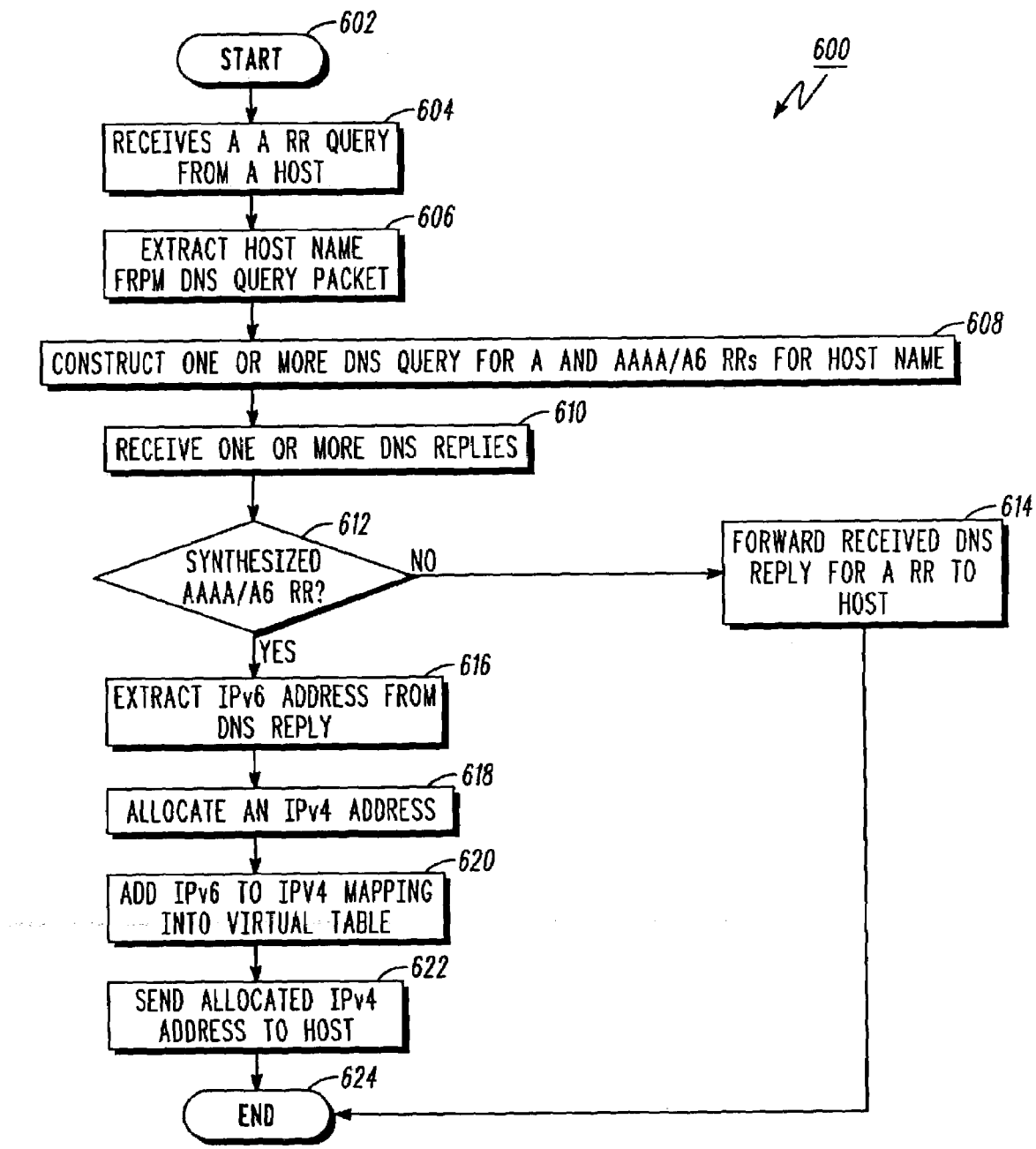
FIG. 6 is a flow diagram illustrating a process of the DNS-ALG operating on a client host's side in accordance with a further embodiment of the invention.

In FIG. 6, a process 600 of operating the DNS-ALG on the client host's side is illustrated in detail. Again, "RR" refers to a resource record. With reference to FIG. 2, the following steps of the process 600 can be understood with regard to the gateway-A 214 for the host H1-A in the home network-A 210 seeking to communicate with the host H1-B in the remote home network-B 260, for example. Likewise, these steps may be performed by gateway-B 264 for the host H1-B when seeking to communicate with the host H1-A.

Processing commences in step 602. In step 604, a DNS name resolution query for the resource record (A RR) type for a remote host is received by the gateway from a client side host. An A RR is an A type resource record indicating an IPv4 address associated with a host name. A RR is specified in Mockapetris, P, "Domain Names—Concept and Facilities," RFC 1034, 1987, and Mockapetris, P, "Domain Names—Implementation and Specification, RFC 1035, 1987. In step 606, the host name is extracted from the DNS query packet by the DNS-ALG. In step 608, a DNS query is constructed for both A and AAAA/A6 RRs for the host name by the DNS-ALG. An AAAA RR and A6 RR are IPv6 equivalents of the IPv4 A RR. AAAA and A6 RRs are defined in Thompson, S, and Huitema, C, "DNS Extensions to support IP version 6", RFC 1886, December 1995, and Crawford, M, Huitema, C, "DNS Extensions to Support IPv6 Address Aggregation and Renumbering," IETF RFC 2874, July, 2000, respectively. The above RRs are standard in queries to resolve a host's IPv4 or IPv6 address. The DNS-ALG then performs the standard DNS name resolution process, as defined in RFC 1034 and RFC 1035. In another embodiment, the DNS-ALG may perform two separate name resolutions by sending out A and AAAA/A6 RR queries in two different DNS query messages. Assuming that remote network has been delegated a global domain name space and the GW is designated as the authoritative name server for the domain name space, the name resolution process performed by the DNS-ALG eventually queries the DNS-ALG running at the remote GW for the target host's IPv6 address.

In step 610, the gateway prepares for the reception of one or more DNS replies and receives one or more DNS replies from the gateway of the remote private network and processing continues to step 612. In step 612, the DNS-ALG determines whether there exists a synthesized IPv6 address in the DNS reply received from the remote gateway. If the address is not a synthesized address (No), the remote host is a legitimate IPv6 host and processing continues at step 614. In step 614, the received DNS reply for the A RR is forwarded to the requesting host. Thus, the requesting host is informed that name resolution has failed.

If a synthesized address exists (Yes) at step 612, processing continues at step 616 where the synthesized IPv6 address is extracted from the DNS reply. In step 618, a peer IPv4 address in the address space of the client-side private network is allocated for the remote host name. This IPv4 address is associated with the extracted synthesized IPv6 address. In step 620, an IPv6 to IPv4 mapping is added to the virtual table 432 of FIG. 4 for the peer IPv4 address and the IPv6 address of the remote host name. In step 622, the allocated IPv4 address is sent to the client side's host. A DNS reply message is constructed with the answer section of the message set to the allocated peer IPv4 address. The client-side IPv4-only host uses the allocated peer IPv4 address when communicating with the remote host. Processing then terminates.

Figure 7:
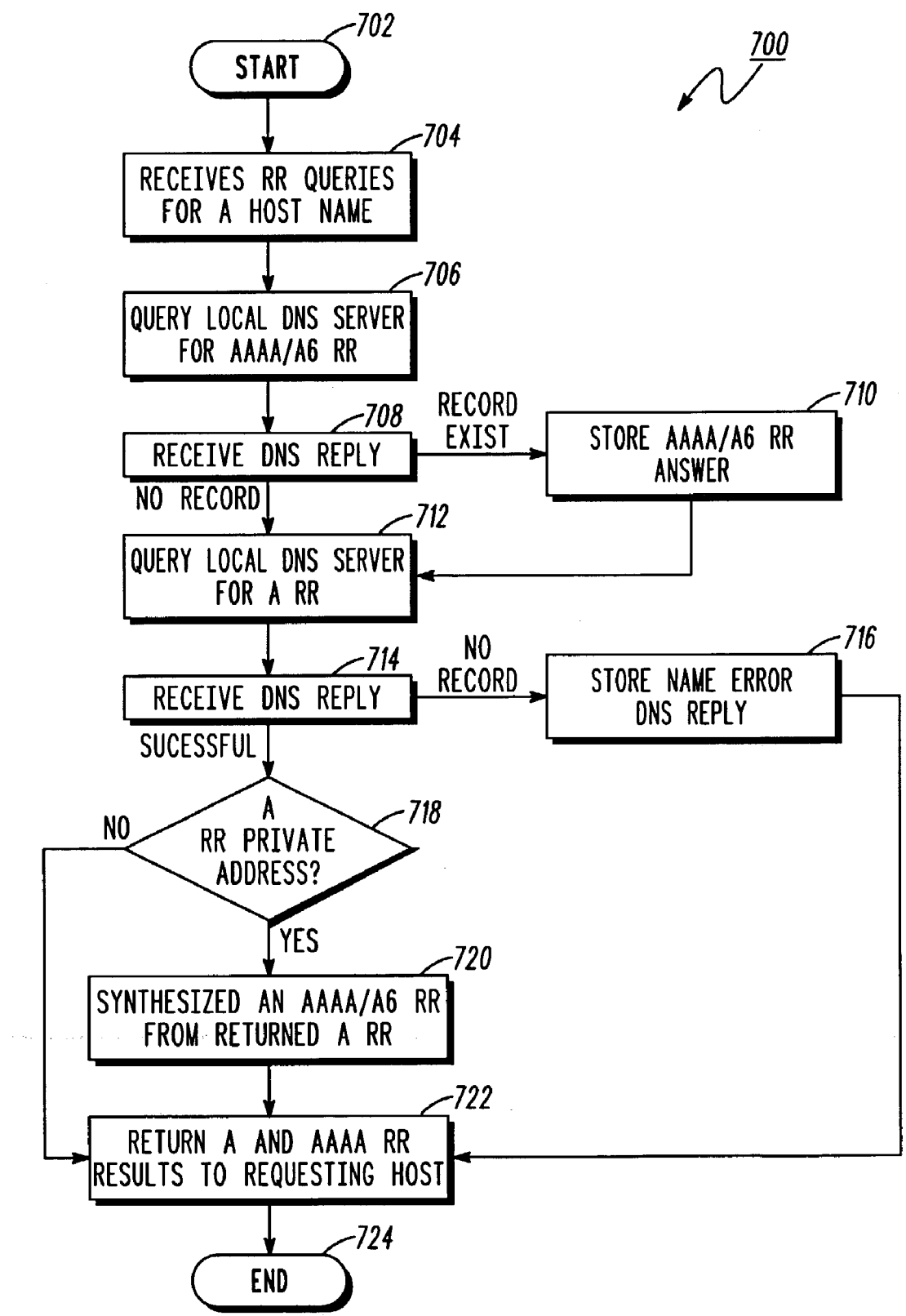
FIG. 7 is a flow diagram illustrating a process of the DNS-ALG operating on a remote host's side in accordance with still another embodiment of the invention.

FIG. 7 is a flow diagram illustrating in detail a process 700 of operating the gateway 410 on a remote host's side. Again with reference to FIG. 2, the following steps of the process 700 can be understood with regard to the gateway-B 264 for the host H1-B of the remote home network-B 260 responding to communication from the host H1-A, for example. Likewise, these steps may be performed by gateway-A 214 for the host H1-A when responding to communication from the host H1-B.

Processing commences in step 702. In step 704, RR queries from the client-side gateway are received by the remote gateway for a host name in the remote private network. In step 706, the local DNS server is queried for an AAAA/A6 RR. In step 708, the gateway prepares for the reception of a reply from the local DNS server. If the query was successful (the record exists), the AAAA/A6 RR is stored in step 710. The processing then proceeds to step 712. If a non-existent record (no record) is determined in step 708, processing continues at step 712. In step 712, the local DNS server is queried for an A RR, seeking an IPv4 address for the remote-side host. In step 714, the gateway prepares for the reception of a DNS reply for the host name. If step 714 determines no A RR exists (no record), processing continues at step 716. In step 716, the name error DNS reply received in step 714 is stored and processing continues to step 722. If step 714 determines a DNS reply was successfully received from the local DNS server, processing continues in step 718. In step 718 the returned A RR in the DNS reply is checked to determine whether the IPv4 address is from the private address space. If it is not (No), processing continues to step 722. Otherwise (Yes), processing proceeds to step 720.

In step 720, an AAAA/A6 RR is constructed from the returned A RR. The IPv6 address is synthesized using the 6to4 prefix, i.e., 2002:GW's IPv4 address:ffff:Host's IPv4 address. The address is peer due to the embedded "ffff", which designates the address as a translatable address. In step 722, the results from the IPv6 query performed in step 706, 712 and 720 are returned to the requesting host by the remote-side gateway. Processing terminates in step 724.

Not shown in FIG. 7 however is the process of allocating a peer IPv4 address corresponding to the requesting host. This IPv4 address is only created upon reception of IPv6 packets from the requesting host where the IPv6 address of the requesting host is extracted from the arriving packets and passed to the DNS-ALG. The DNS-ALG then allocates a free peer address and stores the mapping between the extracted IPv6 address and the allocated IPv4 address.

Advantageously, the embodiments of the invention utilize translation mechanisms, including 6to4 and DNS-ALG, and exploit IPv4 private address space. The embodiments of the invention have application to private networks using IPv4 generally, and in particular have application to home networks. The embodiments may be used in home gateway products or products related to forming virtual private networks. For example, the embodiments of the invention may be implemented in a cable modem. The embodiments may be used in Peer-to-Peer and Home Networking for IPv4-only hosts.

The embodiments of the invention enable home-to-home communications, and also are useful in the creation of virtual private networks.

The detailed description provides a preferred exemplary embodiment only and is not intended to limit the scope, applicability, and/or configuration of the invention. Rather, the detailed description of the preferred exemplary embodiment provides those skilled in the art with enabling descriptions for implementing the preferred exemplary embodiment of the invention. It should be understood that various changes and/or substitutions may be made in the function and arrangement of elements without departing from the scope and spirit of the invention as set forth in the appended claims.

We claim:

1. A method of communicating between IPv4 hosts in networks having private IPv4 address spaces, said method comprising the steps of:
- transmitting from a first private network one or more DNS queries for a remote IPv4 host in a second private network, said one or more DNS queries containing one or more resource record questions for said remote host name based on information from a requesting private IPv4 host in said first private network;
- receiving at said first private network one or more DNS replies from said second private network in response to said one or more DNS queries;
- detecting whether said one or more DNS replies comprises a private IPv4 address for said remote host in said second private network;
- effecting extracting if said one or more DNS replies comprise a synthesized IPv6 address, said effecting extracting in said first private network said IPv6 address for said remote host from said one or more DNS replies, said synthesized IPv6 address including a global IPv6 prefix and said private IPv4 address for said remote host, and allocating a peer IPv4 address in an address space of said first private network for said remote host, said peer IPv4 address associated with said extracted IPv6 address for said remote host; and
- addressing said remote host using said IPv6 address associated with said peer IPv4 address for transmission of IPv4 packets from said first private network addressed using said peer IPv4 address.

2. The method according to claim 1, wherein if said one or more DNS replies comprises said private IPv4 address but not a synthesized IPv6 address, the method performs transmitting from said first private network one or more IPv6 address DNS queries for said remote IPv4 host in said second private network, and receiving at said first private network one or more IPv6 address DNS replies from said second private network containing said synthesized IPv6 address.

3. The method according to claim 2, further comprising the step of constructing an IPv6 address DNS query as one of said DNS queries in response to an IPv4 address DNS query from said requesting private IPv4 host, said remote host name extracted from said IPv4 address DNS query, said step of constructing being effected after the step of detecting.

4. The method according to claim 1, further comprising the step of allocating an IPv4 to IPv6 address mapping in said first private network for associating said peer IPv4 address with said extracted IPv6 address for said remote host, said step of allocating an IPv4 to IPv6 address being effected after the step of detecting.

5. The method according to claim 4, further comprising the step of allocating a peer IPv4 to IPv6 address mapping in said second private network, said step of allocating a peer IPv4 to IPv6 address being effected after the step of transmitting.

6. The method according to claim 5, further comprising the steps of determining whether a private address of said queried remote host is registered in a domain name system of said second private network, and if so, returning said synthesized IPv6 address in said one or more DNS replies.

7. The method according to claim 1, further comprising the steps of translating IPv4 packets into IPv6 packets, said step of translating being effected after the step of addressing.

8. The method according to claim 7, further comprising the step of transmitting said IPv6 packets via an IPv6 global network to said remote host in said second private network.

9. The method according to claim 7, further comprising the step of transmitting said IPv6 packets via an IPv4 global network using IPv6-over-IPv4 tunneling to said remote host in said second private network, said step of transmitting said IPv6 packets being effected after the step of addressing.

10. The method according to claim 1, further comprising the steps of receiving said one or more DNS queries in said second private network, and transmitting said one or more DNS replies from said second private network, said step of receiving said one or more DNS queries being effected after the step of addressing.

11. The method according to claim 10, further comprising the step of requesting by a translator an application-level gateway of a DNS (DNS-ALG) for a peer IPv4 address upon receiving a connection from said remote host with a synthesized IPv6 address, said step of requesting being effected after the step of addressing.

12. The method according to claim 11, further comprising the step of translating IPv6 packets into IPv4 packets in said second private network, said step of translating IPv6 packets into IPv4 packets in said second private network being effected after the step of addressing.

13. The method according to claim 12, further comprising the step of transmitting said IPv4 packets in said second private network to said remote host.

14. The method according to claim 10, further comprising the steps of requesting by a translator a DNS (DNS-ALG) for a peer IPv4 address upon receiving a connection from a remote host with an IPv6 synthesized address.

15. A system for communicating via a gateway between IPv4 hosts in different networks having private IPv4 address spaces and separated by a global network, said system comprising:
- an application-level gateway of a domain name system (DNS-ALG) capable of being coupled to a gateway having a domain name system (DNS) server, said DNS-ALG detecting a need for communications between a first IPv4 host in a first private network and a second IPv4 host in a second private network via said global network using IPv6 packets, said second private network being a different one to said first private network, said DNS-ALG adapted for synthesizing an IPv6 address using a global IPv6 address prefix and a private IPv4 address for said host;
- a virtual table coupled to said DNS-ALG for storing a mapping between IPv4 and IPv6 addresses of one of said first and second IPv4 hosts; and
- a translator coupled to said virtual table for communication with said DNS-ALG, said translator capable of translating IPv4 addresses to IPv6 addresses and IPv6 addresses to IPv4 addresses, and terminating an IPv6 connection through said gateway.

16. The system according to claim 15, wherein a gateway includes a DNS server and said DNS-ALG, said virtual table, and said translator.

17. The system according to claim 15, wherein said translator comprises a network address translator adapted to intercept connections for a peer IPv4 address and an IPv6 address and adapted to request said DNS-ALG to obtain a peer address allocation.

18. The system according to claim 15, wherein said global network IPv4 addressing, and further comprising a 6to4 mechanism coupled to said translator, IPv6 packets being communicated between said 6to4 mechanism and said translator and IPv4 packets being transmitted between said 6to4 mechanism and said global network.

19. The system according to claim 15, wherein a gateway has an associated IPv6 address prefix.

20. A gateway communicating between IPv4 hosts in different networks having private IPv4 address spaces and separated by a global network, said gateway comprising:
   a domain name system (DNS) server;
   an application-level gateway of a domain name system (DNS-ALG) coupled to said DNS server, said DNS-ALG detecting a need for communications between a first IPv4 host in a first private network and a second IPv4 host in a second private network via said global network using IPv6 packets, said second private network being a different one to said first private network, said DNS-ALG adapted for synthesizing an IPv6 address using a global IPv6 address prefix of said gateway and a private IPv4 address for said host;
   a virtual table coupled to said DNS-ALG for storing a mapping between IPv4 and IPv6 addresses of one of said first and second IPv4 hosts; and
   a translator coupled to said virtual table for communication with said DNS-ALG, said translator capable of translating IPv4 addresses to IPv6 addresses and IPv6 addresses to IPv4 addresses, and terminating an IPv6 connection through said gateway.

21. The gateway according to claim 20, wherein said translator comprises a network address translator adapted to intercept connections for a peer IPv4 address and an IPv6 address and adapted to request said DNS-ALG to obtain a peer address allocation.

22. The gateway according to claim 20, wherein said global network utilizes IPv4 addressing, and further comprising a 6to4 mechanism coupled to said translator, IPv6 packets being communicated between said 6to4 mechanism and said translator and IPv4 packets being transmitted between said 6to4 mechanism and said global network.

* * * * *